Feb. 3, 1931.  V. E. YEAGER  1,791,080

STEP BEARING

Filed March 7, 1929

Inventor
V. E. Yeager
By Watson E. Coleman
Attorney

Patented Feb. 3, 1931

1,791,080

UNITED STATES PATENT OFFICE

VIRGIL E. YEAGER, OF ANSLEY, LOUISIANA, ASSIGNOR OF ONE-TENTH TO HENRY HODDE, ONE-TENTH TO EMRA A. GOLDIN, ONE-TENTH TO NANCY L. GOLDIN, ALL OF ANSLEY, LOUISIANA, AND ONE-TENTH TO MARTHA J. BREWTON, OF GOLDONA, LOUISIANA

STEP BEARING

Application filed March 7, 1929. Serial No. 345,209.

This invention relates to thrust bearings or step bearings and the general object of the invention is to provide a bearing of very simple character which is so constructed that a vertical shaft may be supported for rotation without vibration and in which wear of the parts may be reduced to a minimum.

A further object is to provide a construction which may be readily removed for the purpose of inserting new anti-friction elements and readily replaced, and which provides for thorough lubricating of the parts.

My invention is illustrated in the accompanying drawings, wherein:—

Figure 1:
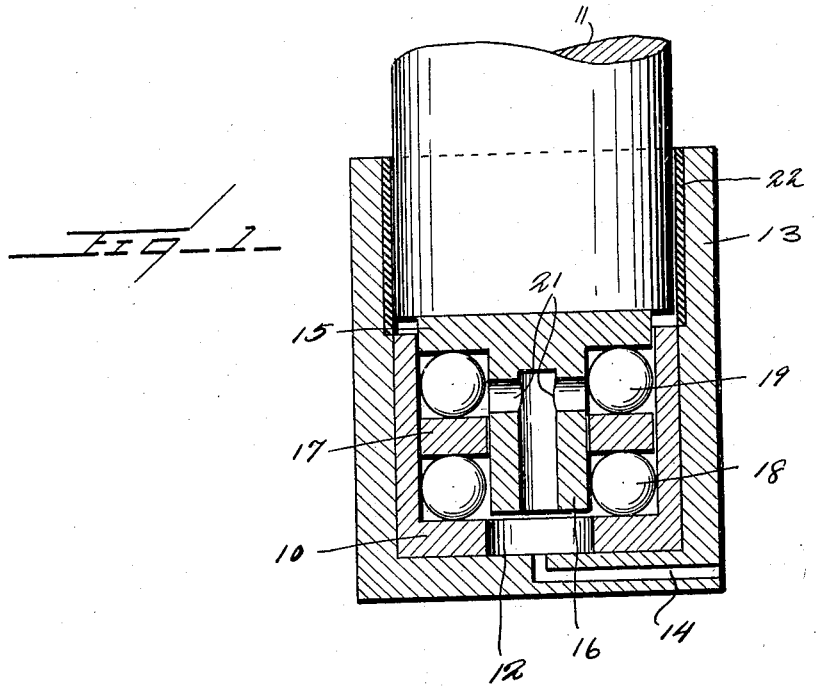
Figure 1 is a vertical sectional view of a thrust bearing constructed in accordance with my invention.
Figure 2:
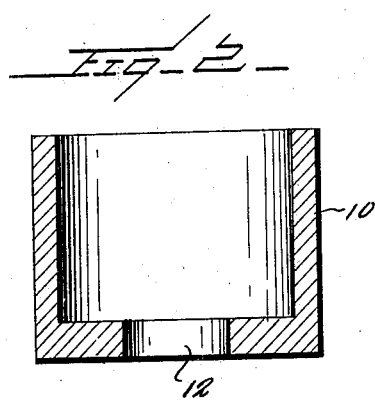
Figure 2 is a sectional view of the cup.
Figure 3:
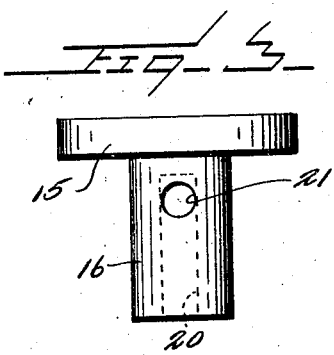
Figure 3 is an elevation of the disk 15 with the stem thereon.
Figure 4:
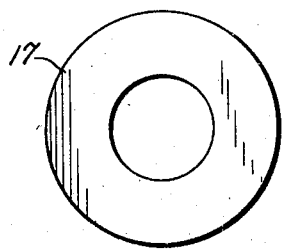
Figure 4 is a plan view of the disk 17.

Referring to these drawings, it will be seen that the bearing comprises the cup 10 which is circular in plan view and which may have a diameter approximately the same as the shaft 11 to be supported.

This cup 10 is shown as being provided with the central apperture 12 and as setting within an outer cup or socket member 13 which extends upward around the lower edge of the shaft 11 and which is provided with a duct 14 which leads to the opening 12. Disposed within the upper end of the cup 10 is a supporting disk 15 having a central downwardly extending stem 16 which passes through an annular disk 17. Between the annular disk 17 and the floor of the cup 10 are disposed anti-friction balls 18 and disposed between the disk 15 and the disk 17 are the anti-friction balls 19 having the same diameter as the balls 18, these balls bearing against the stem 16 and against the inside face of the cup 10. The balls 18 and 19 support the stem 16 so that the stem just escapes any touching of the floor of cup 10. The center of this stem 16 is longitudinally bored as at 20 and is provided with lateral passages 21 communicating with the space between the disks 17 and 15 so that lubricant forced into the bore 20 will be discharged around the balls and will find its way downward around the lower set of balls, lubricant discharged into the opening 12 through the duct 14 also finding its way into the space between the floor of the cup 10 and the disk 17 so that in this way the bearing is fully lubricated.

Of course, it will be understood that the upper and lower faces of the plates or disks 15 and 17 are to be perfectly flat and true so that the disk 15 which supports the shaft 11 may rotate with this shaft at a high speed and without causing any vibration of the shaft.

Of course, the lower end face of the shaft 11 is also to be perfectly flat. The upper end of the cup 13 in opposition to the lower end of the shaft should have a Babbitt metal lining as indicated at 22.

I have found from actual experience that it is particularly necessary to have two sets of anti-friction elements operating between the upper disk and the middle disk and between the middle disk and the bottom of the cup as otherwise with only one set of anti-friction elements operating between a disk and a supporting member, considerable friction is produced and very great vibration under high speeds. My invention does not cause any hanging of the parts on each other or grinding action. This bearing is particularly valuable for side head shafts in lumber mills. These shafts have cutter heads on them to dress the lumber on its edges and in order to dress the lumber smoothly, there must be no vibration in the side head shaft. My device I have found in practice gives a suitable anti-friction support for the side head shaft without any tendency for the latter to vibrate.

I claim :—

1. An anti-friction step bearing comprising an outer cup, an inner cup shorter than the outer cup, a disk fitting inside the inner cup and having a central depending stem, an annular disk fitting within the inner cup and loosely surrounding the stem, anti-friction balls disposed between the two disks and between the annular disk and the bottom of the cup, the balls having a diameter equal to the distance between the stem and the inner face of the inner cup, and a shaft flattened at one end and fitting against the upper disk and fitting within said outer cup, the outer cup having means whereby lubricant may be supplied to the interior of the cup.

2. An anti-friction step bearing comprising an outer cup, an inner cup shorter than the outer cup, a disk fitting inside the inner cup and having a central depending stem, an annular disk fitting within the inner cup and loosely surrounding the stem, anti-friction balls disposed between the two disks and between the annular disk and the bottom of the cup, the balls having a diameter equal to the distance between the stem and the inner face of the inner cup, and a shaft flattened at one end and fitting against the upper disk and fitting within said outer cup, the inner cup having a central opening in its bottom through which lubricant may be discharged, and the stem having a central bore provided with lateral passages for the lubricant, the balls supporting the central stem with its lower stem in spaced relation to the bottom of the cup.

3. An anti-friction step bearing comprising an outer cup, an inner cup shorter than the outer cup, a disk fitting inside the inner cup and having a central depending stem, an annular disk fitting within the inner cup and loosely surrounding the stem, anti-friction balls disposed between the two disks and between the annular disk and the bottom of the cup, the balls having a diameter equal to the distance between the stem and the inner face of the inner cup, and a shaft flattened at one end and fitting against the upper disk and fitting within said outer cup, the inner cup having a central opening in its bottom through which lubricant may be discharged, and the stem having a central bore provided with lateral passages for the lubricant, the balls supporting the central stem with its lower stem in spaced relation to the bottom of the cup, the outer cup having a lubricating duct in its bottom extending to the center of the bottom and opening with the central aperture of the bottom of the inner cup.

4. An anti-friction step bearing comprising an outer cup, an inner cup shorter than the outer cup, a disk fitting inside the inner cup and having a central depending stem, an annular disk fitting within the inner cup and loosely surrounding the stem, anti-friction balls disposed between the two disks and between the annular disk and the bottom of the cup, the balls having a diameter equal to the distance between the stem and the inner face of the inner cup, and a shaft flattened at one end and fitting against the upper disk and fitting within said outer cup, the inner wall of the outer cup above the upper end of the inner cup having an anti-friction lining.

In testimony whereof I hereunto affix my signature.

VIRGIL E. YEAGER.